Aug. 16, 1938.   C. F. HIRSHFELD   2,127,219
SPRING
Filed Feb. 21, 1935
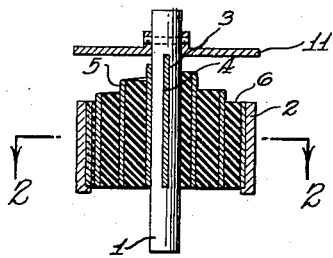
Fig. 1.
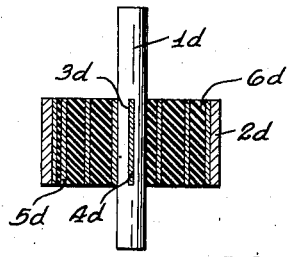
Fig. 11.
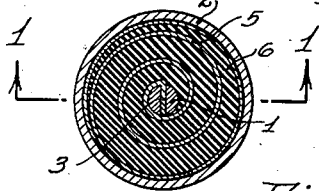
Fig. 2.
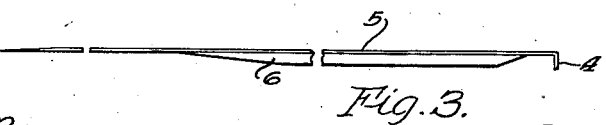
Fig. 3.
Fig. 4.
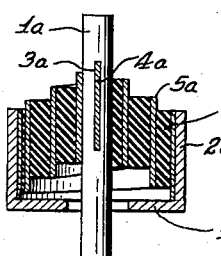
Fig. 5.
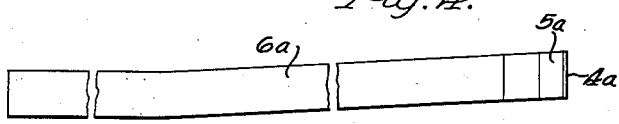
Fig. 6.
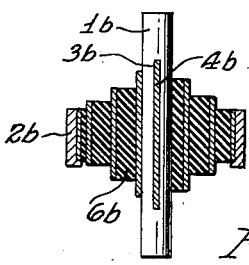
Fig. 7.
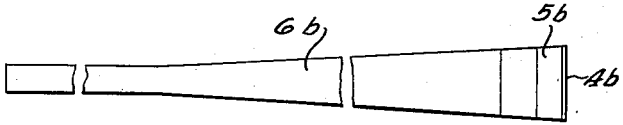
Fig. 8.
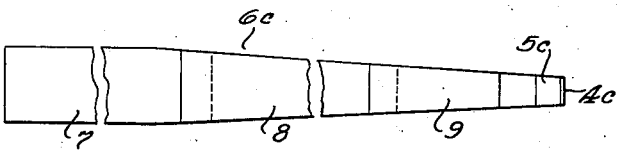
Fig. 10.
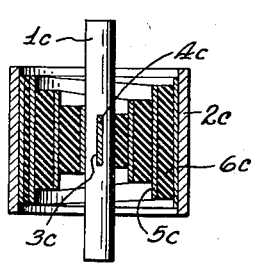
Fig. 9.
INVENTOR
Clarence F. Hirshfeld
BY
ATTORNEY Patented Aug. 16, 1938

2,127,219

UNITED STATES PATENT OFFICE 2,127,219

SPRING

Clarence F. Hirshfeld, Detroit, Mich., assignor, by mesne assignments, to Transit Research Corporation, New York, N. Y., a corporation of New York Application February 21, 1935, Serial No. 7,586

21 Claims. (Cl. 267—63)

This invention relates to springs of the type wherein a mass of elastic material, such as rubber, is placed between two stiff concentric load imposing and load receiving members as the springing means, the major deflection being along the axis of such members.

Springs of this type are well known in the art wherein the mass of rubber is in the form of a cylinder with the top and bottom of the cylinder being parallel. Such springs have a characteristic load-deflection curve which is determined by the shear resistance of the rubber and may not be suitable in many installations. A principal object of this invention is to teach the construction of springs of this general type wherein the slope of this characteristic curve may be altered infinitely throughout a wide range to obtain any pre-determined slope within that range, and likewise to provide a spring wherein this characteristic curve may be altered also.

Another object is to provide a spring of this type having no natural frequency and hence not resonant to any single frequency either alone or in combination with a load thereon.

It is well understood, in springs of this type employing rubber alone between the metallic members that an axial loading on one member causes uneven distortion of the rubber. The top surface assumes a curved shape and the rubber tends to pull away from the central member, the stiffness of the rubber spring decreasing toward the center because of the relatively smaller area in shear. On the other hand, if the rubber be replaced with a metallic volute spring, the converse would be true because the stiffness of the volute spring increases at its smaller coils. It is an object of this invention to provide a spring by so combining rubber and a metallic volute spring that the distortion in the direction of bending will be substantially or entirely eliminated with the result that the top and bottom of the spring will remain substantially straight during operation.

Another important object is to teach a simple and improved manner of manufacturing springs of this type, the subsequent operation thereof tending to increase the bond between the rubber and the concentric metallic members between which it resides.

Other objects and advantages will become hereinafter more fully apparent as reference is had to the accompanying drawing, wherein my invention is illustrated by way of example and not in a limiting sense, and in which Figure 1 is a longitudinal section of my improved spring containing the axis and taken along the line 1—1 of Figure 2, Figure 2 is a transverse section normal to the axis taken along the line 2—2 of Figure 1, Figure 3 is a side elevation of the springing elements before rolling or winding, Figure 4 is a top elevation of the springing elements of Figure 3, Figure 5 is a section similar to Figure 1 showing a modified form of the invention, Figure 6 is a top plan of the springing elements of Figure 5 before rolling or winding, Figure 7 is a section similar to Figure 1 showing a further modification thereof.

Figure 8 is a top plan of the springing elements of Figure 7 before rolling or winding, Figure 9 is a section similar to Figure 1 showing another modification thereof, Figure 10 is a top plan view of the springing elements of Figure 9 before rolling, and Figure 11 is a section similar to Figure 1 showing a further modification thereof.

Referring first to Figures 1 to 4, 1 and 2 denote stiff concentric members either one of which may be the load imposing and the other the load receiving member. The inner member 1 is preferably provided with a slot 3 extending therethrough for the reception of the inner end 4 of a metallic spiral or volute spring 5. The spring 5 is of such diameter that its outer coil extends to and firmly contacts over a substantial area thereof with the outer member 2. A volute 6 of elastic material, such as rubber, is also interposed between the members 1 and 2 with its coils, residing individually between the coils of the volute 5.

In order to make and assemble this spring, a strip of metal intended to form the volute 5 may be laid out flat as illustrated in Figures 3 and 4 and a strip of rubber 6 is laid thereon, the rubber 6 being of substantially the same form but terminating some distance from each end of the metallic strip. The metal and rubber are then preferably surface bonded together. The end 4 is then inserted into the slot 3 of the member 1 and rolled with pressure applied thereto so that the metal and rubber are tightly wound into volutes around the member 1 whereupon they are inserted into the member 2 and the pressure released. The metal is of such length that its last coil forms a cylinder. Tendency of the volutes to unwind sets up a firm frictional engagement of the last coil of the metal 5 with the surface of the member 2. This method of installing rubber under compression in a cylinder is believed broadly novel. The cylinder 2 is formed with an internal flange 10 which also acts as a retainer for the outer coil of the volute 5.

It will be noted that the metallic area between the inner end of the rubber and the end 4 before winding serves to give a substantial area of contact between the volute and the member 1 which prevents undue shearing forces at the slot 3. Instead of the slot 3 any other suitable form of mechanical anchorage may be employed.

In Figures 5, 7, 9 and 11, the springs are made similarly to that of Figures 1 to 4 with the difference in shapes illustrated being obtained by cutting the rubber and metallic strips to be wound as respectively illustrated in Figures 6, 8 and 10, the strips for the form shown in Figure 11 not being separately illustrated. The numerals 1a, 1b, 1c, 1d, 2a, 2b, . . . etc., refer respectively to the corresponding parts described in connection with Figures 1 to 4.

In Figures 9 and 10 the rubber strip is illustrated as being composed of a plurality of longitudinal sections 7, 8 and 9 of different grades of rubber such that upon assembly the rubber will vary progressively in hardness from the member 1 to the member 2 as will be hereafter again referred to. This composite rubber may be employed with any of the forms shown.

It is well understood in the art that rubber in shear will have a constant load deflection ratio,—that is, if a given loading causes a deflection of a certain amount, twice as much loading will cause twice that deflection. The typical load deflection curve is thus a straight line. Where the rubber is of substantial unsupported thickness, this straight line curve is distorted because of the bending of the rubber, the curve under bending having a different shape. The bending which occurs decreases from the inner to the outer member because the area in shear at the inner member is less than that at the outer member. A volute spring also has a straight line load deflection curve which is also disturbed by bending moments. This spring is stiffer at its smaller coils than at its outer coils, contrary to the rubber. Thus, it will be seen that it is possible to so combine and coordinate the metallic volute and the rubber that bending will be substantially or entirely eliminated. It will also be seen that while the curve of the metallic volute as well as the curve of the rubber are both straight lines they may have different slopes and hence the resultant slope may be varied by varying the thickness, elasticity and height dimensions of the rubber and the metallic volute whereby, within a wide range, any desired slope can be obtained. By employing rubber of progressively increasing hardness it is also possible to obtain stresses in the rubber such that the shear stresses at the inner member will be substantially equal to the shear stresses at the outer member although the areas are greatly different.

In Figure 5 is illustrated a stop means 10 below the spring whereby the volute will progressively contact the stop and relieve that portion of the spring from further deflection. In this manner the load deflection curve is no longer a straight line but has entirely different characteristics. A combination of this stop means with the other forms shown in Figures 1, 5, 7 and 9 permits a change in the location of this curve throughout a wide range. The stop may be placed atop the spring and integral with the center member as shown at 11 in Figure 1.

It should also be noted that each coil of a volute spring has its individual natural frequency and the volute as a whole is not resonant to any single frequency. The combination of the rubber and metallic volute is therefore not resonant to any single frequency.

Various other designs will suggest themselves to those skilled in the art and I desire to be extended protection as defined by the appended claims in which

What I claim is:

1. In a spring device, concentric load imposing and load receiving members, and a mass of rubber between said members, said rubber being composed of a strip of rubber rolled into a volute form for interposition between said members said load imposing member being axially movable relative to said load receiving member.

2. In a spring device, concentric load imposing and load receiving members, a strip of rubber wound tightly into a volute for interposition between said members, said strip before being wound varying in width from one end to the other thereof and also being composed of a plurality of constituent longitudinal sections together progressively varying in unit elasticity from one end thereof to the other.

3. In a spring device, a load imposing and a load receiving member having interposed therebetween an elastic volute and a metallic volute with the coils of each interposed between the coils of the other, said load imposing member being axially movable relative to said load receiving member.

4. In a spring device, concentric load imposing and load receiving elements having an elastic volute and a metallic volute therebetween, the coils of each of said volutes being interposed between the coils of the other, said elastic volute being installed between said elements under substantial compression, said load imposing member being axially movable relative to said load receiving member.

5. In a spring device, a load imposing and a load receiving member having interposed therebetween an elastic volute and a metallic volute with the coils of each interposed between the coils of the other, one end of said metallic volute being mechanically anchored to one of said members, the other end of said metallic volute being frictionally anchored to the other of said members.

6. In a spring device, concentric load imposing and load receiving members having interposed therebetween an elastic volute and a metallic volute with the coils of each interposed between the coils of the other, and surface bonded to the coils of the other, said load imposing member being axially movable relative to said load receiving member.

7. In a spring device, concentric load imposing and load receiving members, a metallic volute between said members with its inner end anchored to the inner of said members, a volute of elastic material with its coils interposed between the coils of said metallic volute, said volute of elastic material being surface bonded to the adjacent surface of said metallic volute.

8. In a spring device, concentric load imposing and load receiving members, a volute of elastic material and a volute of metallic material interposed between said members, the coils of each of said volutes being interposed between the coils of the other of said volutes, said volutes varying together in height from one of said members to the other.

9. The combination as set forth in claim 8 wherein said metallic volute and said rubber volute are bonded together over substantially their entire length.

10. In a spring device, a shaft having a slot therethrough extending for a substantial length longitudinally thereof, a cylinder concentric with said shaft, a metallic volute spring having one end inserted through said slot and its other end terminating in contact with said cylinder, and a rubber volute having its coils interposed between the coils of said metallic volute and substantially co-extensive in area therewith.

11. The combination as set forth in claim 10 wherein said metallic volute is bonded to said rubber volute.

12. In a spring device, concentric load imposing and load receiving members, a mass of rubber interposed between said members, said load imposing member being adapted for relative axial movement with respect to said load receiving member whereby said rubber is loaded in shear, and means for maintaining the top and bottom surfaces of said rubber substantially straight in vertical cross section during loading thereby maintaining the distortion thereof substantially constant.

13. In a spring device, concentric load imposing and load receiving members, a metallic volute spring between said members inherently stiffer toward the inner of said members, and means interposed between the coils of said spring to increase the effective stiffness thereof towards the outer of said members whereby the distortion thereof under loading is substantially constant.

14. In a spring device, concentric load imposing and load receiving members, a mass of rubber between said members inherently stiffer toward the outer of said members, and means for progressively stiffening the effective resistance of the spring towards said inner member whereby the distortion of said rubber under loading is substantially uniform throughout the whole thickness thereof.

15. In a spring device, concentric load imposing and load receiving members having interposed therebetween an elastic volute and a metallic volute with the coils of each interposed between the coils of the other, said metallic volute and said rubber volute being so proportioned as to thickness and elasticity that the distortion thereof under loading is substantially uniform through the whole thickness thereof.

16. In a spring device, concentric load imposing and load receiving members having interposed therebetween a metallic volute with rubber interposed between the coils thereof, and a stop adjacent an edge of said volute with which said volute progressively contacts under loading.

17. In combination, a spring comprising concentric load imposing and load receiving members having a mass of rubber therebetween adapted for shear loading upon relative axial movement of said members, and stop means acting progressively and continuously in the direction of the radial thickness of the rubber for relieving said rubber of additional distortion during loading whereby the characteristic load deflection curve of said rubber in shear may be changed to a smooth curve having a different characteristic.

18. Suspension means for connecting a sprung member to a supporting member comprising a load supporting spring of the convolute type having the outer portion supported on one of the members and having the inner end connected to the other of said members, and a yieldable material disposed between and secured to the convolutions of the spring said spring member being movable axially of said supporting member to impose shear loading on said yieldable material.

19. Suspension means for connecting a sprung member to a supporting member comprising, a housing secured to one of said members, a spring of the volute type located within the housing and having the outer portion secured to the member aforesaid by the housing, means connecting the central portion of the spring to the other of said members, and a yieldable vulcanizable material disposed between and vulcanized to the convolutions of the spring.

20. Suspension means for connecting a sprung member to a supporting member comprising, a spring of the convolute type arranged with the convolutions thereof substantially in a common plane in the loaded position of the spring, means connecting the outer portion of the spring to one of the members, means connecting the central portion of the spring to the other member, and a yieldable vulcanizable material disposed between the convolutions of the spring and vulcanized to said convolutions in the loaded position aforesaid of the spring.

21. Suspension means for connecting a sprung member to a supporting member comprising a spring of the volute type arranged in a plane substantially at right angles to the direction of relative movement of said members, a housing for the spring secured to one of said members, means connecting the central portion of the spring to the other of said members, and a yieldable vulcanizable material disposed between and vulcanized to the convolutions of the spring.

CLARENCE F. HIRSHFELD.